Jan. 28, 1947.  C. S. SELTZER  2,414,905
WELDING MACHINE
Filed Sept. 15, 1944  3 Sheets-Sheet 1

Inventor
CLIFFORD S. SELTZER
By Francis J. Klempay
Attorney

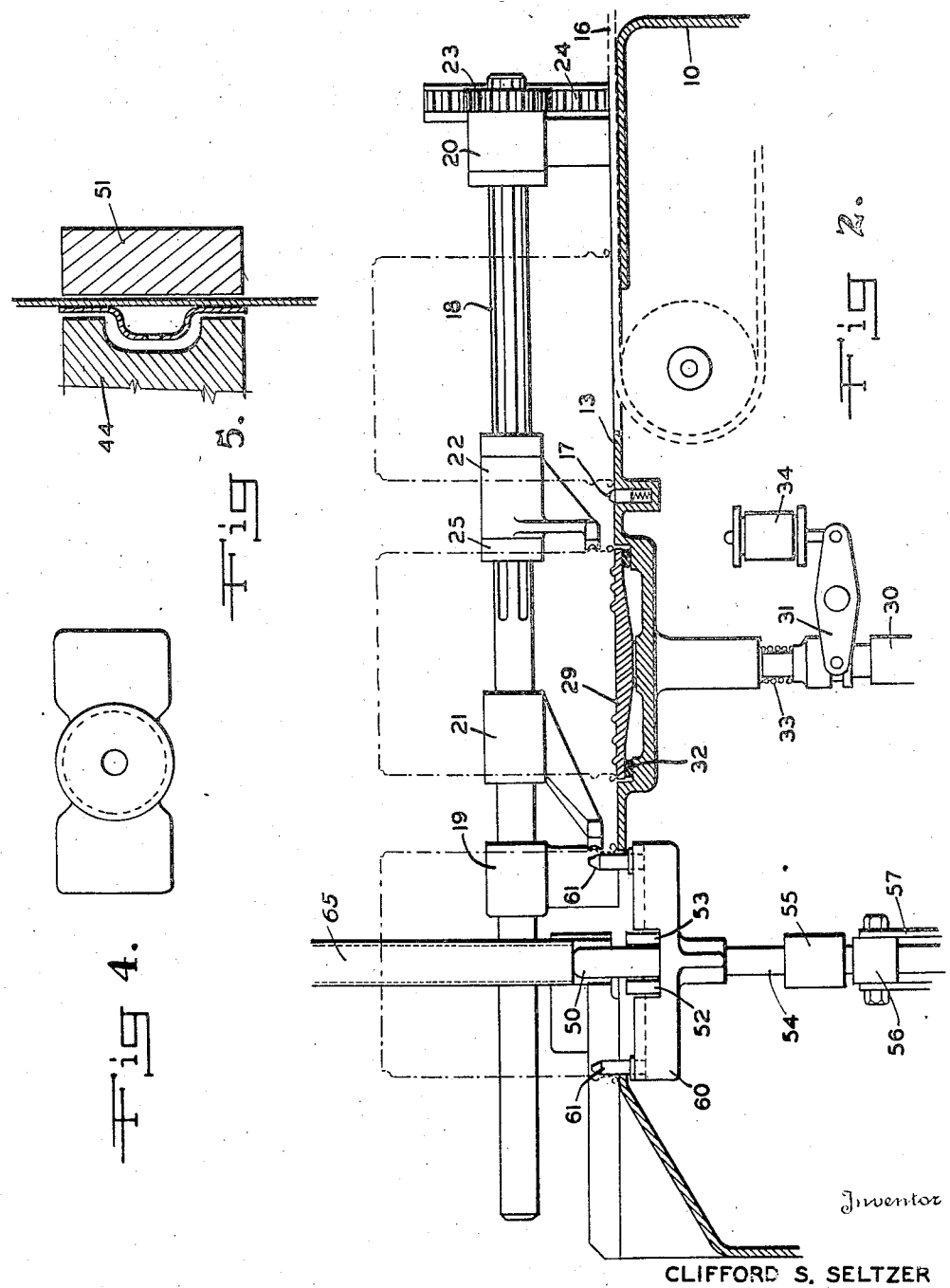

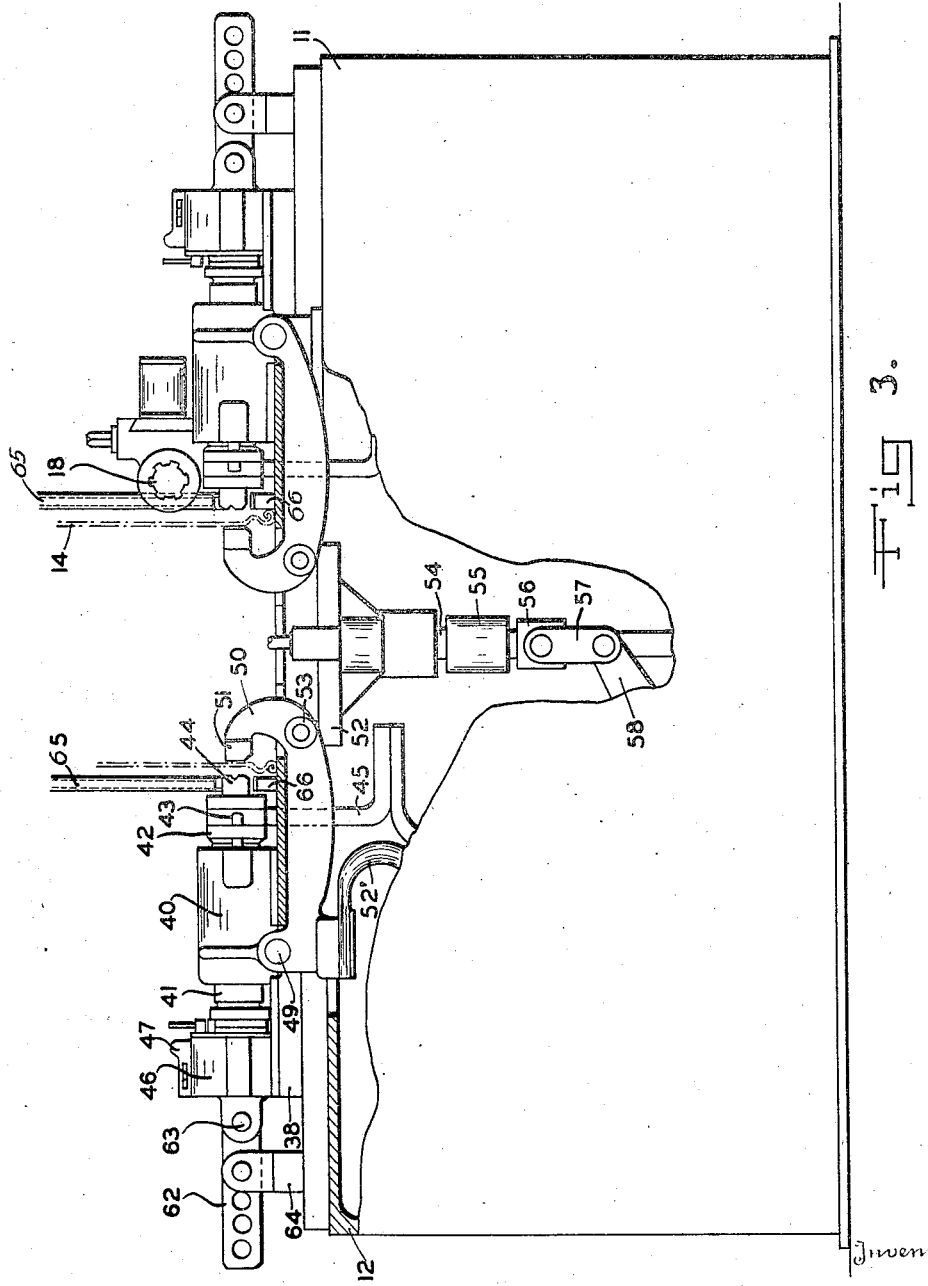

Patented Jan. 28, 1947

2,414,905

UNITED STATES PATENT OFFICE 2,414,905

WELDING MACHINE

Clifford S. Seltzer, Warren, Ohio, assignor to The Taylor-Winfield Corporation, Warren, Ohio, a corporation of Ohio Application September 15, 1944, Serial No. 554,323

10 Claims. (Cl. 219—4)

This invention relates to electric resistance welding and more particularly to improved welding machines employing the electric resistance heating principle. The primary object of the invention is the provision of such apparatus which is operative to weld metallic attachments or other metallic objects to preformed sheet metal bodies in a wholly reliable and expeditious manner. Thus, the principles of the present invention are advantageously applicable in connection with the automatic making of metallic containers and, in particular, in the applying and fastening of the conventional bail anchoring ears to the outer surfaces of tubular container bodies. While the invention will be hereinafter specifically described in connection with such specific use it should be understood that the invention is considered to reside in the apparatus, the complete assembly as well as certain component parts of which being of utility for other specific purposes as will readily become apparent.

A further object of the invention is the provision of improved electric resistance welding apparatus having the capability outlined above which is simple in design, readily constructible, but which nevertheless is operative to effect the stated fabrication in a rapid automatic manner and with a high degree of consistency in the quality of the welds produced. A more specific object of the invention is the provision of an apparatus having the characteristics outlined which is readily adaptable to bodies of different sizes and to the simultaneous affixation of a pair of objects to each succeeding body and in predetermined spaced relation with respect to the bodies.

Yet another object of the invention is the provision of an automatic machine which is operative to weld metallic objects to surfaces of metallic bodies which surfaces may have been previously lithographed, painted or otherwise treated throughout substantially the whole of their areas. It is, of course, essential that such surfaces be clear at the point or points of weld and provision is made in the apparatus of the present invention to automatically orient the bodies with respect to the welding dies so that such clear spots will be positioned at the dies during the welding operations. This mode of procedure is particularly advantageous in the container making art as the sheets forming the body portions of the containers may be lithographed, painted, or otherwise treated while yet in the flat state.

Still another object of the invention is the provision in an automatic machine for welding metallic objects onto metallic bodies of improved means for moving the bodies to the welding station of the machine in succession and of improved means for aligning the bodies with respect to the welding dies at the welding station.

The above and other objects and advantages of the invention will become apparent upon consideration of the following detailed specification and the accompanying drawings wherein there is disclosed a preferred embodiment of the invention.

In the drawings:

Figure 2 is a longitudinal sectional view of the apparatus of Figure 1;

Figure 3 is a transverse sectional view of the apparatus of Figure 1, the view being taken along the line 3—3 of Figure 1;

Figure 4 is a plan view of the bail anchoring ear which is affixed by the apparatus of Figure 1; and Figure 5 is a vertical sectional view through one of the pairs of welding dies of the apparatus of Figure 1.

Figure 1:
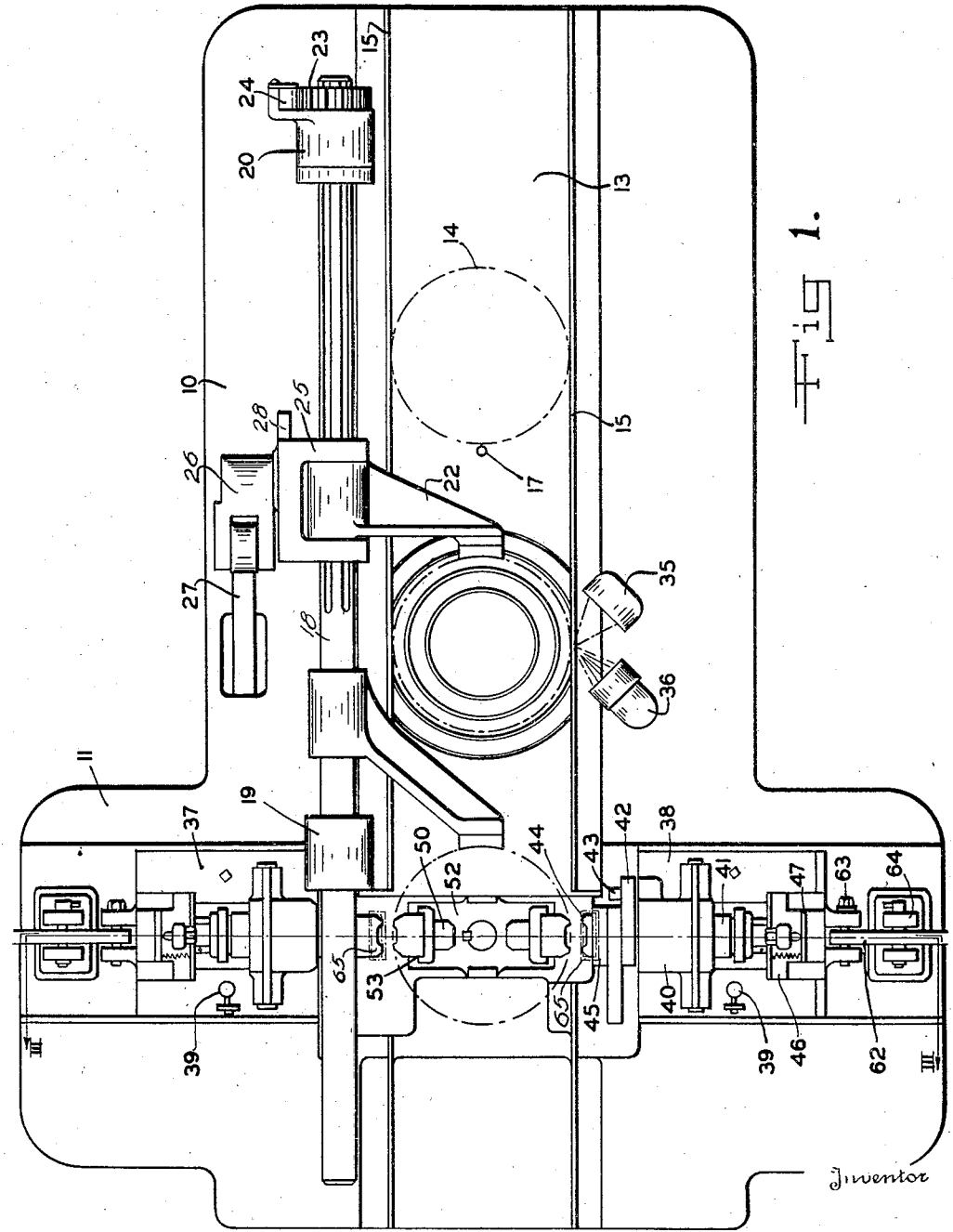
Figure 1 is a plan view of a machine constructed according to the principles of the invention.

Referring to the drawings, reference numeral 10 designates a main frame or housing having a pair of laterally extending wings 11 and 12. Extending longitudinally along the upper surface of the housing 10 is a track 13 for the slideable support of the bodies 14 to which the objects are to be welded and on either side of the track 13 is a guide 15 which, in practice, are adjustably mounted for movement toward and away from each other to accommodate objects of different sizes. A conveyor belt 16 is arranged to deposit the objects onto the track 13 from the apparatus ahead of the present equipment in the production line. As indicated, the objects 14 illustrated are open topped metal containers and these are deposited on the track 15 bottom side up.

A spring pressed detent 17 engages the lower edges of the successive cans to stop the sliding movement of the cans at a predetermined position which will be hereinafter referred to as the pick-up station of the apparatus. A splined shaft 18 is rotatably and slideably mounted in longitudinally spaced supports 19 and 20 extending upwardly from the base 10 and adjustably but rigidly secured to this shaft is a pair of longitudinally spaced arms 21 and 22. As shown, the shaft 18 is positioned to one side of the path of movement of the bodies 14 and splined on the shaft is a gear 23 which meshes with a rack 24 which is raised and lowered, in timed sequence, by a suitable driving mechanism, not shown, to rock the shaft 18 thereby rotating the arms 21 and 22 into and out of the path of travel of the bodies 14. A yoke 25 spanning the hub of arm 22 is adjustably connected with and carries a member 26 which in turn is connected with a reciprocating operating rod 27. Shaft 18 is free to rotate in yoke 25 and the yoke is slideably supported on a guideway 28. Rod 27 is reciprocated in proper timed sequence by suitable driving mechanism, not shown, and in each cycle of operation the rack 24 is first actuated to rotate the arms 21 and 22 upwardly out of the path of movement of the bodies 14 after which the rod 27 acts to slide shaft 18 to the right as viewed in Figure 1 a distance slightly greater than the interval between stations in the apparatus. Rack 24 then again operates but in opposite direction to lower arms 21 and 22 behind the next two bodies and to complete the cycle of operation rod 27 moves forwardly to advance these two bodies to their next succeeding stations.

Rotatably mounted substantially in the plane of the supporting surface 13 is a turntable 29 driven by a rotating shaft 30 through a clutch 31. A friction brake is provided in the form of an annular band 32 permanently loaded by a spring 33. Clutch 31 is disengaged by energization of a solenoid 34 which energization is controlled by a device operable in response to the rotational position of a container supported on the turntable 29. Such device may comprise a photoelectric tube 35 receiving light from a source 36 as reflected from the outer peripheral surface of the body supported on the turntable. The can bodies almost invariably have pronounced longitudinal seams and the appearance of such seams at the point of reflection of the pencil of light is sufficient to interrupt the response from tube 35 to such a degree that the relay apparatus employed, not shown, will effect the energization of solenoid 34. Suitable time delay apparatus may be employed to prevent the de-energization of solenoid 34 until after the can body is moved off the turntable. In this manner the orientation of the successive bodies with respect to the machine proper and the welding dies of the welding station is effected preparatory to the movement of the bodies to the welding station. During the cycle of movement of the shaft 18 the arm 21 moves one of the bodies from the turntable 29 to the welding station while the arm 22 moves the next succeeding body from the pick-up station to the orienting station at the turntable 29. Longitudinal adjustment of the arms 21 and 22 provides for the handling of bodies of different diameter.

Adjustably mounted in suitable guideways formed in or on the housing wings 11 and 12 are the plates 37 and 38 which mount identical welding assemblies. These plates are adjustable toward and away from the center axis of the path along support 13 to provide for the handling of different size bodies and locking pins 39 are provided to hold the plates 37 and 38 in adjusted position. Since both welding assemblies are identical but one will be described in detail.

Referring to Figures 1 and 3, a tubular member 40 is carried by the plate 38 to slideably receive a quill 41. To the inner end of the quill 41 is secured a mounting pad 42 having an offset aperture to slideably receive a longitudinally projecting pin 43 carried by the side wall of the member 40. Thus the quill and pad 42 are held against rotation. Clamped to the pad 42 is a welding die 44 and the end of a welding current conductive bar 45. Rigidly connected with the opposite end of the quill 41 is one of the relatively movable terminals of a fluid pressure filled collapsible device the principal body portion 46 of which is slideably mounted on the plate 38. It will be understood that the element 46 constitutes the opposite end terminal of the collapsible member so that upon movement of the housing 46 in a direction toward the container held in the welding station quill 41 will likewise move until substantial resistance to such continued movement of the quill is encountered after which the collapsible device will begin to collapse while exerting a pressure on the quill determined by the pressure of the fluid employed. In accordance with usual practice this collapsible driving device carries a switch 47 which closes during the collapsing of the device to initiate the flow of welding current to the electrodes thus inserting the application of proper welding force during each succeeding welding operation.

Pivotally mounted on the block 33 at 49 but insulated therefrom is a downwardly looped current carrying arm 50 having a return portion at its free end on which is mounted a welding die or electrode 51. Bolted to the arm 50 is a flexible current conductive band 51' and it will be understood that in practice band 51' and bar 45 are connected to the end terminals of a welding transformer secondary whereby welding current may be supplied to the electrodes 44 and 51. Arm 50 is arranged to be rocked up and down whereby the electrode 51 as well as a portion of the arm 50 may be alternately moved into the lower end of the containers in effecting the welds and out of the path of travel of the containers during indexing movement of the container body moving means. For this purpose I provide an elevating mechanism including a table 52 to support a pair of rollers 53 journaled on the arm 50. Table 52 is formed for vertical movement on a post 54 which slides up and down in a bearing support 55. A driving block 56 is adjustably phased to the post 54 and links 57 coupled with a forked lever 58 are connected to the block 56 to move the post 54. It will be understood that a suitable driving mechanism, not shown, is employed to move the lever up and down in proper timed sequence to raise the arm 50 and properly position the electrode 51 immediately upon completion of the indexing movement of the shaft 18 and to lower the post 54 and consequently the arm 50 following completion of a welding operation and prior to the next succeeding cycle of movement of the shaft 18 to allow the welding container to be moved away from the welding station while the next succeeding container is moved into position.

To insure the proper alignment of the bodies with respect to the welding electrodes at the welding station table 52 is provided with a pair of oppositely directed lugs 60 which extend longitudinally of the path of travel of the bodies 14 and each of which is provided with an upwardly tapering pin 61. Pins 61 are mounted for adjustment longitudinally along the projection 60 to center bodies of different diameters and by referring to Figure 2 it should be obvious that upon upward movement of the post 54 the tapering surfaces of the pins 61 will engage the inner peripheral edges of the container previously moved to the welding station by the arm 21 and the container will be shifted longitudinally in one direction or the other to allow the pins 61 to enter within the container. By adjusting the interval between the outer edges of the pins 61 to correspond exactly with the inner diameter of the container the container will be very accurately located as will be understood. Thus the apparatus of the invention provides means not only to properly orient the containers with respect to the welding electrodes but also insures that the bail anchoring ears are attached to the container bodies at exactly diametrically opposite points which is advantageous in the manufacture of containers of the type to be used with supporting bails.

To effect operative movement of the device 46 and consequently of the quill 41 a link 62 is pivotally connected to the device 46 at 63 and pivotally connected to the link 62 is a forked lever 64 which is moved by a suitable drive mechanism, not shown, in properly timed sequence to effect a welding operation following the placing of a body at the welding station and the raising of the post 54. The apparatus heretofore described is entirely capable of complete automatic operation and in furtherance of this feature means is provided to feed the ears to be welded to the container bodies to the welding assemblies in an automatic manner. One of the ears employed is shown in detail in Figures 4 and 5 and, incidentally, improved and more consistent welding results are attained if the ears are provided with a plurality of welding projections. Projecting upwardly from the die 44 and in closely spaced relation with the adjacent side wall of the container body 14 is a chute 65 in which the ears are stacked one above the other while aligned in proper relative position for direct application to the outer surfaces of the container bodies. Chutes of this nature as well as automatic hopper fed devices for maintaining the chutes filled are well known in the art. Figure 3 shows the various parts in position for effecting the welds and upon completion of the welding operation die 44 is retracted by operation of the lever 64 whereupon the lowermost ear in the chute 65 can drop into the position in front of die 44 preparatory to the next welding operation which will attach this particular ear to the outer surface of a container body. A stop 66 limits downward movement of the ears in front of die 44.

It should now be apparent that I have provided an improved welding machine which accomplishes the objects initially set out. While the apparatus is fairly simple in design and easy to construct it is capable of automatically welding ears, attachments, or other objects onto the outer surfaces of metallic bodies at predetermined locations on said bodies in a reliable, efficient and rapid manner. The adjustments required to handle bodies of different sizes are few in number and readily accessible on the outside of the machine so that any required changeover may be effected in a minimum of time. It should be observed that no adjustments are required as regards variations in the height of the tubular bodies being handled.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. In an automatic machine for welding bail anchoring ears to the side walls of metallic containers having longitudinal side seams the combination of means to move successive containers along a path in step by step progression, a plurality of stations along said path, means at one of said stations to rotate the containers to predetermined orientation of said side seams with respect to the axis of said path, a movable inner welding die at another of said stations to engage the inner surfaces of said containers, means at said latter station to supply bail ears in succession, an outer movable welding die at said latter station to engage said ears, and means to move said dies toward each other for applying welding force therethrough as well as to supply welding current thereto whereby said ears may be welded to said containers.

2. In an automatic machine for welding bail anchoring ears to the side walls of tubular metallic containers the combination of means to move successive containers along a path in step by step progression, a movable inner welding die associated with a stopping point along said path to engage the inner surfaces of said containers, means fixed in relation to said point to supply bail ears in succession, an outer movable welding die opposite said inner die to engage said ears, and means to move said dies toward each other for applying welding force therethrough as well as to supply welding current thereto whereby said ears may be welded to said containers.

3. In an automatic machine for welding metallic objects to the side walls of tubular metallic bodies the combination of means to support said bodies on end and to move the same in step by step progression along a predetermined path, rotatable means at one of the stopping points along said path to effect predetermined orientation of said bodies with respect to the axis of said path, a welding assembly at another of the stopping points along said path including welding dies to engage the inner surfaces of said bodies and the outer surfaces of the objects to be welded to said bodies, means to effect relative movement of said bodies and welding assembly axially of said bodies, means to effect opening and closing movement of said dies, means to feed successive objects to be welded to said bodies to said assembly, and means to supply welding current to said dies.

4. In an automatic machine for welding metallic objects to the side walls of tubular metallic bodies the combination of means to support said bodies on end and to move the same in step by step progression along a predetermined path, a welding assembly associated with a stopping point along said path and comprising movable welding dies to engage the inner surfaces of said bodies and the outer surfaces of said objects to be welded to said bodies, means to effect relative movement between said bodies and welding assembly axially of said bodies, means to supply said objects successively to said welding assembly upon each opening movement of said dies, means to open and close said dies and to apply welding force therethrough, and means to supply welding current to said dies.

5. In an automatic machine for welding metallic objects to the side walls of tubular metallic bodies the combination of means to support said bodies on end and to move the same in step by step progression along a predetermined path, a welding assembly associated with a stopping point along said path and including a welding die for engaging the inner surfaces of said bodies and a second cooperating welding die for engaging the outer surfaces of the objects to be welded to said bodies, means mounting said first mentioned die for vertical movement into and out of said bodies, and means mounting said second mentioned die for movement toward and away from the longitudinal axis of the bodies at rest at said stopping point, and means to apply welding current to said dies.

6. In an automatic machine for welding metallic objects to the side walls of tubular metallic bodies the combination of means to support said bodies on end and to move the same in step by step progression along a predetermined path, a welding assembly associated with a stopping point along said path and including an inner welding die to engage the inner surface of said bodies and an outer welding die for engaging the outer surfaces of the objects to be welded to said bodies, said inner die being carried by an overhanging arm pivotally mounted for rotation about a horizontal axis spaced outwardly of said path of movement, means operable synchronously with said body moving means to rotate said arm in such direction that said inner die is positioned within the bodies immediately following the halting of said bodies at said point, means mounting said outer die for movement toward and away from said inner die when the latter is in inner operative position, and means to supply welding current to said dies.

7. In an automatic machine for welding metallic objects to the side surfaces of tubular metallic bodies the combination of means to support said bodies on end and to move the same in step by step progression along a predetermined path, a body supporting turntable in said supporting means at one of the stopping points along said path, means to rotate said turntable, means responsive to said bodies attaining a predetermined orientation while supported on said turntable to interrupt rotation of said turntable, a welding assembly associated with a stopping point along said path following said first mentioned stopping point, said welding assembly including welding current conductive electrodes for engaging the inner surfaces of said bodies and the outer surfaces of said objects to be welded to said bodies, and means operable synchronously with said body moving means to move said electrodes and to apply welding force and current through said electrodes.

8. In an automatic machine for welding metallic objects to the side surfaces of tubular metallic bodies the combination of elongated supporting means adapted to slideably receive the bodies supported on end, means to guide the bodies along said support, a welding station including movable electrodes for engaging the inner surfaces of said bodies and the outer surfaces of said objects to be welded to said bodies, means to slideably move said bodies in succession to said welding station comprising a shaft extending parallel with and mounted to one side of said support, means to rock said shaft in alternate directions and to reciprocate the same axially, an arm keyed to said shaft for engaging the side surfaces of said bodies to slide the bodies along said support, and means operable synchronously with said shaft rocking and reciprocating means to move said electrodes and to apply welding force and current therethrough.

9. In an automatic machine for welding a pair of spaced bail anchoring ears to each of a plurality of container bodies supported on end and moving in spaced step by step progression along a predetermined path the combination of a pair of spaced movable electrodes adapted to be moved into each succeeding body as the same pauses at a location along said path, a movable electrode associated with each of said first mentioned electrodes to provide complete welding assemblies at diametrically opposite locations on said bodies, means to open and close the electrodes of each assembly, means to supply a bail ear to each of said second mentioned electrodes upon each opening movement thereof, and means to apply welding force and current through the electrodes of each of said assemblies.

10. In an automatic machine for welding metallic objects to the side surfaces of tubular metallic bodies the combination of means to support said bodies on end and to move the same in step by step progression along a predetermined path, a platen, means mounting said platen for sliding movement toward and away from the path of movement of said bodies in directions substantially normal thereto, an inner welding electrode, a downwardly looped support carrying said inner electrode at its inner end and pivotally mounted to said platen at its outer end, means operable synchronously with said body moving means to raise and lower the inner end of said support, a quill slideably mounted on said platen and carrying at its inner end an outer welding electrode adapted to engage the outer surfaces of said objects when positioned in operative relation with respect to said inner electrode, means on said platen to move said quill in a direction applying welding force between said electrodes, and means to conduct welding current to said electrodes.

CLIFFORD S. SELTZER.